Sept. 18, 1951 R. L. DOWNEY 2,568,435
THERMAL COMPENSATION SYSTEM
Filed Nov. 26, 1946
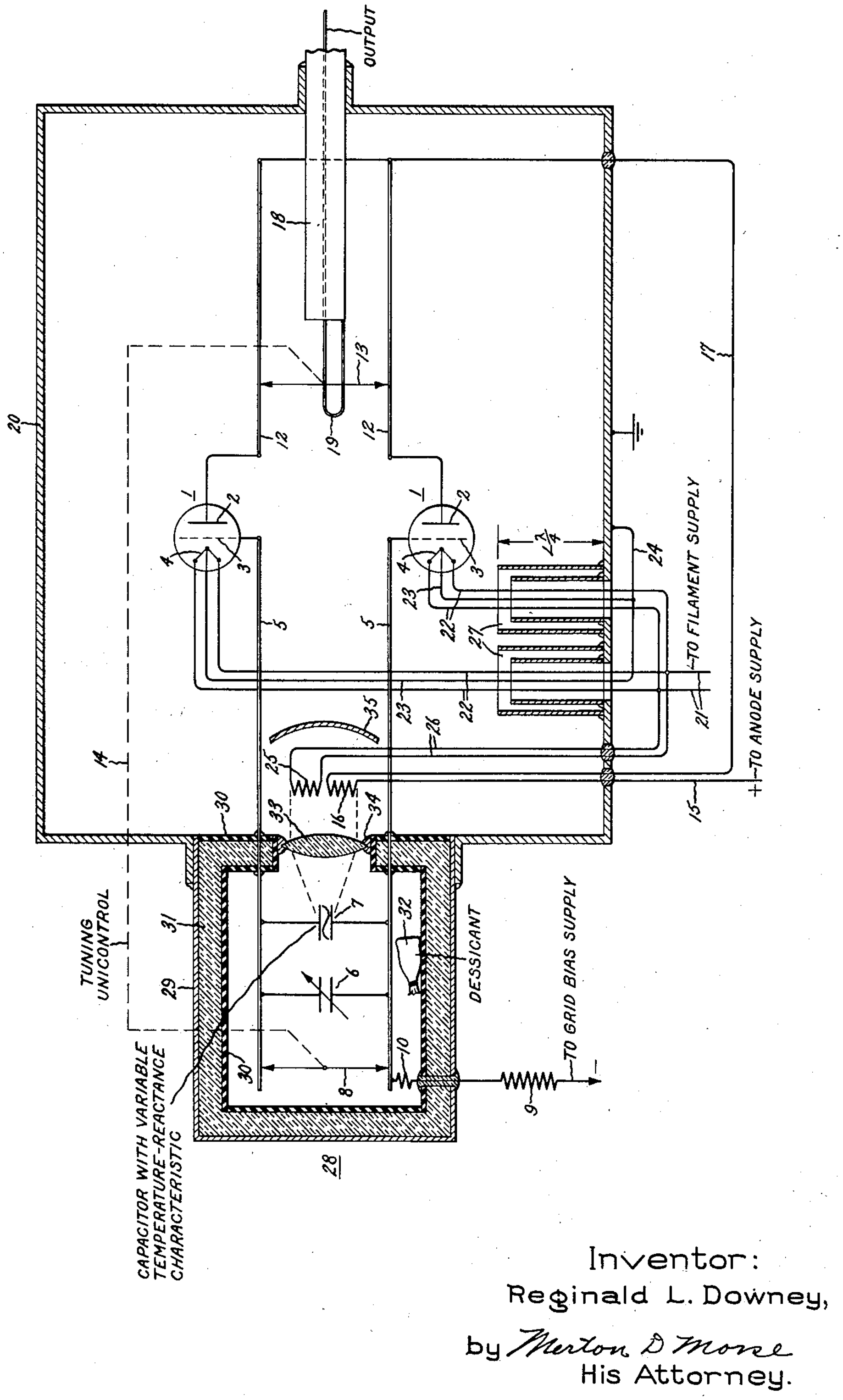
Inventor:
Reginald L. Downey,
by Merton D Moore
His Attorney.

Patented Sept. 18, 1951 2,568,435

UNITED STATES PATENT OFFICE 2,568,435

THERMAL COMPENSATION SYSTEM

Reginald L. Downey, Syracuse, N. Y., assignor to General Electric Company, a corporation of New York Application November 26, 1946, Serial No. 712,340

7 Claims. (Cl. 250—36)

My invention relates to a thermal compensation system for stabilizing the operation of an electrical apparatus having an electrical characteristic which tends to vary undesirably with changes in currents or voltages therein. My invention is particularly applicable to high frequency oscillator circuits in which changes in the operating currents or voltages may tend to vary the frequency of operation.

It is often desirable to apply heat to thermo-responsive elements in circuits operating at high radio frequencies in such a manner as to compensate for temperature changes due to the heating of tube elements, variations in line voltages, and the like. For effective control action, it is necessary to provide good thermal conductivity between the heating element, which is responsive to the electrical condition causing the undesired variation, and the thermo-responsive element which produces the corrective action. However, particularly in circuits operating at ultra-high frequencies any appreciable stray capacity between the elements of the system will more than offset the advantages to be obtained, by causing other undesirable effects on the frequency, restriction of frequency range, parasitic oscillations, and the like. As will become apparent from the following specification, these difficulties are obviated and numerous advantages are realized by a particular arrangement of these elements which separates them physically and utilizes radiant heat to effect the compensation.

It is accordingly an object of my invention to provide an improved thermal compensation system, particularly adapted to the requirements of ultra-high frequency oscillation equipment, which minimizes the effect of stray capacities and is simple and stable in operation.

It is another object of my invention to provide an improved frequency stabilizing system for alternating current apparatus.

It is a further object of my invention to provide an improved thermal compensation system for an ultra-high frequency oscillator in which the frequency controlling elements may be separately enclosed in an hermetically sealed chamber to stabilize them from the effects of ambient temperature and humidity changes, and in which further thermal compensating means is provided for stabilizing the oscillator against changes in currents in the circuits thereof.

The features of my invention which I believe to be novel are set forth with particularity in the appended claims. My invention itself, however, together with further objects and advantages thereof, may best be understood by reference to the following description taken in connection with the accompanying drawing which illustrates one embodiment of my invention. In order to simplify the drawing, certain structural elements have been shown in sectional side elevation, while conventional electrical components and circuit connections of the oscillator have been represented schematically.

For purposes of illustration, there is shown a conventional type of ultra-high frequency, push-pull oscillator of the tuned-grid, tuned-plate type, utilizing open-wire transmission lines for tuning and including a pair of triode electron discharge devices 1, each having an anode 2, control grid 3 and directly-heated cathode 4. The control grids 3 are connected to one end of an open-wire transmission line 5. The line tuning is determined conjointly by the values of an adjustable capacitor 6, a compensating capacitor 7 (to be described later in greater detail) and by the position of an adjustable shorting member 8. Grid bias potentials are supplied from a suitable grid bias supply (not shown) through a self-bias resistor 9 and an isolating resistor 10 connected in series with the shorted end of the line 5.

The anodes 2 of the oscillator are also connected to an open-wire transmission line 12 which comprises the tuned plate circuit. Tuning is accomplished by adjustment of shorting member 13 which is ganged to shorting member 8, as indicated by the dashed line 14, for unitary tuning control adjustment, as is well understood in the art. Anode operating potential is supplied from a suitable anode supply source (not shown) through conductor 15, a resistance heating element 16 (the function of which will be described later in detail), and conductor 17 connected to the shorted end of transmission line 12. Output energy from the oscillator may be supplied to any suitable utilization device (not shown) over a concentric line 18 having a coupling loop 19 inductively coupled to the anode line 12.

For purposes of electrical shielding, the oscillator circuits are enclosed in metallic, grounded containers 20 and 29. Heating current for the filamentary cathodes 4 is supplied from a suitable filament supply source (not shown) through the common supply conductors 21 and the parallel connections 22 to the respective cathodes. If the filament supply is an alternating current source, as is conventional, the mid-points of the cathodes are grounded through conductors 23 and 24, as shown. For purposes later to be described, a second resistance heating element 25 is also energized in parallel to the cathodes 4 over conductors 26.

In order to maintain the cathodes 4 at suitable radio frequency potentials with respect to ground and to control the degree of regeneration or feedback between the anode and grid circuits, the cathode connections are made through the concentric transmission line stubs 27 each having the shorted end thereof supported by the grounded shield 20. To obtain a high radio frequency impedance at the upper ends of these stubs 27, they are made approximately a quarter wavelength long at the operating frequency (generally slightly less than a quarter wave length). The function and operation of these stubs 27 is well understood in the art and will not be analyzed in detail here.

In order to render the oscillator as free as possible from the effects of changes in ambient temperature and humidity, a portion of the grid line 5 and remaining frequency control elements 6, 7, and 8 are enclosed in an hermetically sealed, heat-insulated chamber 28. As shown, it comprises spaced inner and outer shells 29 and 30 filled with any suitable heat-insulating material 31, such as rock wool, for example. The outer shell 29 may be the metallic shielding container previously described, and the inner shell 30 may be composed of insulating material. Shell 30 may also be used to support transmission line 5. Moisture may be removed from the interior of the chamber by means of any suitable dessicant material 32, such as silica gel, for example. Temperature control of the interior of this enclosure (not shown) may also be provided by any one of a number of means well known to the art.

In operation of any oscillator, particularly an ultra-high frequency oscillator of the type illustrated, variations in the currents and voltages of the oscillator circuits tend to cause frequency variations, both during the initial warm-up period and during normal operation. In accordance with my invention, such frequency variations are compensated by directing radiant heat from resistances 16 and 25 upon the capacitor 7 through an uninsulated portion in the wall of the chamber 28. As shown in the drawing, an aperture is provided in the wall of chamber 28 adjacent the capacitor 7 into which is fitted a window 33 retained in place by a sealing gasket 34. This window 33 is illustrated in the form of a lens having the proper focal length to concentrate radiant heat from resistors 16 and 25 upon the capacitor 7. In some cases it may optionally be desirable to form it as a plane glass or mica window, or equivalent. A concave reflector or mirror 35 may also be placed behind the resistance heaters to concentrate the heat.

The capacitor 7 is designed to provide a predetermined amount of capacity supplementing that of the adjustable capacitor 6 and also a predetermined temperature-reactance characteristic required for the compensating action. The particular characteristics selected will of course depend upon the particular design of the oscillator, but capacitor 7 may, for example, comprise a ceramic capacitor having a negative temperature coefficient. Such capacitors are well known to the art and utilize special dielectric materials, such as titanium dioxide, so that as the temperature of the capacitor is increased, its capacitance decreases, or vice versa.

The manner in which the frequency of the oscillator is affected by current and voltage variations in the circuits thereof will be different for different types of oscillators, but in the type illustrated an increase in either the filament supply voltage for the cathodes 4 or in the anode supply voltage for the anodes 2 will normally result in changes in the physical and electrical characteristics of the oscillator tubes 1 such that an increase in either voltage tends to decrease the oscillator frequency. It will be observed that if this occurs, additional heat will be radiated by the resistor 16 or 25, or both. This will in turn increase the temperature of capacitor 7, decreasing its capacitance and causing a compensating increase in the resonant frequency of the grid circuit (which is the primary frequency-determining circuit in the type of oscillator illustrated).

In the illustrated embodiment the resistor 16 has been shown in series with the anode supply while the resistor 25 has been shown in shunt to the filament supply. It will be obvious that the control effects may be varied by using other combinations of shunt and series connections. For example, to obtain adequate compensation, it may be necessary in some cases to use both series and shunt heating resistors in both circuits; while in other types of oscillators a single resistor responsive to current or voltage in one of the circuits alone may be sufficient to effect the desired compensation.

These and many other obvious modifications within the scope of my invention will readily occur to those skilled in the art. For example, in some cases the frequency variation may be such that a reactance of positive temperature-reactance characteristic may be required. In other types of oscillators, such as of the Colpitts and Hartley types, the temperature responsive element may be an inductance having a variable temperature characteristic. The temperature responsive element can also be selected to have a predetermined rate of change in reactance so as to correct for a predetermined rate of frequency variation during the warm-up period when the oscillator is first energized. Suitable heat lagging material may be placed around the reactance element 7 for this purpose.

An important feature of my invention is the fact that the resistors 16 and 25 are physically spaced from the compensating capacitor 7 so that stray capacities which might otherwise cause undesirable frequency range restriction due to feedback, parasitic oscillations, and the like, are prevented. The arrangement also makes it possible to enclose the primary frequency-control elements of the oscillator in a separate, hermetically sealed chamber where they are relatively free from thermal inertia effects which would otherwise occur if the heat transfer from resistors 16 and 25 was accomplished by conduction or convection, rather than by radiation. The remainder of the oscillator circuits therefore need not necessarily be thermally insulated in order to assure stability of operation.

While I have shown a particular embodiment of my invention and have suggested various modifications that may be made therein, it will of course be understood that I contemplate by the appended claims to cover these and any other modifications that fall within the true spirit and scope of my invention.

What I claim as new and desire to secure by Letters Patent of the United States is:

1. In an oscillator including a frequency-determining circuit and a power supply circuit, the frequency of operation of said frequency-determining circuit being subject to undesirable variations in response to variations in current in said power supply circuit, a frequency control element for said oscillator comprising a reactance in said first circuit having a variable reactance-temperature characteristic, a heating element physically spaced from said reactance for developing radiant heat in response to said current and means for directing said radiant heat upon said reactance, said reactance being arranged to be substantially unaffected by heat transferred by conduction or convection from said element, the variations in frequency due to said radiant heat being opposite to the variations due to said current.

2. In an oscillator, a first, frequency-determining circuit for said oscillator including a frequency control element having a variable impedance-temperature characteristic, a power supply circuit for said oscillator, the frequency of operation of said first circuit being undesirably affected by current and voltage variations in said second circuit, means for developing radiant heat in response to said variations, and means for subjecting said element to said radiant heat means comprising thermal-insulating material interposed between said heat-developing means and said element for substantially preventing heat transfer between said heat-developing means and said element by conduction or convection, the variation in frequency due to the effect of said radiant heat upon said element being in a sense to compensate for the effect of said variations.

3. In a high frequency oscillator, a resonant circuit for controlling the frequency of said oscillator, said resonant circuit including a capacitor having a variable reactance-temperature characteristic, a power supply circuit for said oscillator, the frequency of operation of said resonant circuit being undesirably affected by current and voltage variations in said supply circuit, heating means energized from said supply circuit and subject to said variations, and means for subjecting said capacitor to radiant heat from said heating means, means comprising thermal-insulating material interposed between said heat-developing means and said element for substantially preventing heat transfer therebetween by conduction or convection, the effect upon frequency due to change in reactance of said capacitor with temperature being in a sense to oppose the effect of said variations.

4. In a high frequency oscillator including an electron discharge device having anode, grid and cathode-heating circuits, frequency determining means in said grid circuit including a capacitance of negative temperature coefficient, resistance heating means for developing radiant heat in response to currents in said anode and cathode-heating circuits, and means for directing said radiant heat upon said capacitance.

5. In a high frequency oscillator whose frequency of operation tends to vary with changes in current in a power supply circuit thereof, tuning means for said oscillator including a capacitance having a negative temperature coefficient, a hermetically sealed chamber enclosing said tuning means, said chamber being heat-insulated except for a portion adjacent said capacitance, and resistance heating means energized from said circuit for developing radiant heat as a function of said current, said heating means being physically positioned outside said chamber so as to direct said radiant heat upon said capacitance through said portion.

6. In a high frequency electron discharge oscillator whose frequency of operation tends to vary undesirably with variations in current in a power supply circuit thereof, frequency control means for said oscillator including a reactive element having a variable temperature frequency characteristic, a hermetically sealed chamber enclosing said frequency control means, said chamber being heat-insulated except for a window adjacent said element, a resistance heating means energized from said circuit for developing radiant heat in response to said current, and means for concentrating said heat upon said element through said window, the change in frequency due to said heat being opposed to changes due to said current variations.

7. In a high frequency oscillator including an electron discharge device having anode, grid and cathode-heater circuits and wherein the frequency of operation tends to have undesired variations caused by variations in anode and heater potentials, the combination of frequency control means in said grid circuit including a tuning reactance having a variable temperature-reactance characteristic, a closed chamber substantially surrounding said frequency control means, said chamber being thermally insulated except for a heat transfer window adjacent said reactance, a pair of resistance heaters outside said chamber adjacent said window, said heaters being energized from the anode current and cathode-heater potential respectively, and means for focusing radiant heat from said heaters upon said reactance.

REGINALD L. DOWNEY.

REFERENCES CITED

The following references are of record in the file of this patent:

UNITED STATES PATENTS

| Number | Name | Date |
|---|---|---|
| 2,115,578 | Hall | Apr. 26, 1938 |
| 2,182,377 | Guanella | Dec. 5, 1939 |
| 2,191,315 | Guanella | Feb. 20, 1940 |
| 2,234,328 | Wolff | Mar. 11, 1941 |
| 2,422,971 | Kell et al. | June 24, 1947 |
| 2,437,085 | Evans | Mar. 2, 1948 |
| 2,470,425 | Bell | May 17, 1949 |
| 2,483,070 | Spindler | Sept. 27, 1949 |
| 2,539,218 | Worcester, Jr. | Jan. 23, 1951 |